(12) United States Patent
Gong

(10) Patent No.: US 11,703,971 B2
(45) Date of Patent: Jul. 18, 2023

(54) TOUCH UNIT, DISPLAY DEVICE AND MANUFACTURING METHOD WITH AN OPENING ON AN INTERCONNECTING MEMBER OF A TOUCH ELECTRODE

(71) Applicants: Chengdu BOE Optoelectronics Technology Co., Ltd., Chengdu (CN); BOE TECHNOLOGY GROUP CO., LTD., Beijing (CN)

(72) Inventor: Qing Gong, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/834,300

(22) Filed: Jun. 7, 2022

(65) Prior Publication Data

US 2022/0300104 A1 Sep. 22, 2022

Related U.S. Application Data

(62) Division of application No. 16/767,734, filed as application No. PCT/CN2019/087055 on May 15, 2019, now Pat. No. 11,366,536.

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05);
(Continued)

(58) Field of Classification Search
CPC .. G06F 3/0412; G06F 3/04164; G06F 3/0446; G06F 2203/04103; G06F 2203/04111
See application file for complete search history.

(56) References Cited

U.S. PATENT DOCUMENTS 10,698,551 B2    6/2020  Ye
11,366,536 B2 *  6/2022  Gong .................... G06F 3/0412
(Continued)

FOREIGN PATENT DOCUMENTS

CN    107957816 A    4/2018
CN    108958552 A   12/2018
(Continued)

OTHER PUBLICATIONS

International Search Report of PCT/CN2019/087055 in Chinese, dated Feb. 13, 2020 with English translation.
(Continued)

*Primary Examiner* — Liliana Cerullo
(74) *Attorney, Agent, or Firm* — Collard & Roe, P.C.

(57) ABSTRACT

A touch unit and a manufacturing method thereof, a touch structure, and a display device are disclosed. The touch unit includes a first touch electrode, a second touch electrode, a first interconnecting member and a second interconnecting member; the first touch electrode and the second touch electrode are insulated from each other and are arranged to be intersected with each other; the first interconnecting member is configured to electrically connect the first touch electrode, and the second interconnecting member is configured to electrically connect the second touch electrode; at least one of the first interconnecting member or the second interconnecting member defines a first opening.

14 Claims, 12 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | |
|---|---|---|
| 2017/0162637 A1 | 6/2017 | Choi et al. |
| 2019/0079622 A1 | 3/2019 | Choi et al. |
| 2020/0050829 A1 | 2/2020 | Akcasu |
| 2020/0064968 A1 | 2/2020 | Kim et al. |
| 2020/0073493 A1 | 3/2020 | Chen et al. |
| 2020/0110525 A1 | 4/2020 | Park et al. |
| 2020/0168671 A1* | 5/2020 | Jang ................... H01L 27/326 |

FOREIGN PATENT DOCUMENTS

| | | |
|---|---|---|
| CN | 109002205 A | 12/2018 |
| CN | 109388288 A | 2/2019 |
| CN | 109508109 A | 3/2019 |

OTHER PUBLICATIONS

Notice of Transmittal of the International Search Report of PCT/CN2019/087055 in Chinese, dated Feb. 13, 2020.
Written Opinion of the International Searching Authority of PCT/CN2019/087055 in Chinese, dated Feb. 13, 2020 with English translation.
U.S. Office Action in U.S. Appl. No. 16/767,734 dated Nov. 5, 2021.
U.S. Notice of Allowance in U.S. Appl. No. 16/767,734 dated Feb. 17, 2022.
Chinese Office Action in Chinese Application No. 201980000655.X dated Mar. 31, 2023 with English translation.

* cited by examiner (1)

(2)

(1)

(2)

TOUCH UNIT, DISPLAY DEVICE AND MANUFACTURING METHOD WITH AN OPENING ON AN INTERCONNECTING MEMBER OF A TOUCH ELECTRODE

CROSS REFERENCE TO RELATED APPLICATIONS

The present application is a division application of U.S. patent application Ser. No. 16/767,734 filed on May 28, 2020, which is a U.S. National Phase Entry of International Application No. PCT/CN2019/087055 filed May 15, 2019. The above-identified applications are incorporated by reference herein in their entirety.

TECHNICAL FIELD

At least one embodiment of the present disclosure relates to a touch unit, a manufacturing method thereof, a touch structure, and a display device.

BACKGROUND

With the continuous development of touch screen technology, multi-functional touch panels, especially touch panel products with touch sensing function and under-screen photographed function have become more and more popular. For existing touch panels with under-screen photographed function, structures for realizing touch function may block incident light from ambient environment, which restricts a definition of environmental images and degrades user's experience.

SUMMARY

At least one embodiment of the present disclosure provides a touch unit, the touch unit includes: a first touch electrode and a second touch electrode insulated from each other, the first touch electrode and the second touch electrode being arranged to be intersected with each other; a first interconnecting member configured to electrically connect the first touch electrode; and a second interconnecting member configured to electrically connect the second touch electrode. At least one of the first interconnecting member and/or the second interconnecting member defines a first opening, and the second interconnecting member is electrically connected with the second touch electrode directly.

For example, in the touch unit provided by at least one embodiment of the present disclosure, on a first plane where the touch unit is located, an orthographic projection of each of the first touch electrode, the second touch electrode, the first interconnecting member and the second interconnecting member is located outside an orthographic projection of the first opening.

For example, in the touch unit provided by at least one embodiment of the present disclosure, on a first plane where the touch unit is located, an inner side of the first interconnecting member partially surrounds the first opening.

For example, in the touch unit provided by at least one embodiment of the present disclosure, the second interconnecting member comprises a left part, a right part and a top part, the left part, the right part and the top part are electrically connected.

For example, in the touch unit provided by at least one embodiment of the present disclosure, at least one of the left part and the right part is electrically connected with the top part directly.

For example, in the touch unit provided by at least one embodiment of the present disclosure, an area of the first interconnecting member is smaller than an area of the second interconnecting member.

For example, in the touch unit provided by at least one embodiment of the present disclosure, the first interconnecting member at least comprises a bottom part which is not overlapped with the top part.

For example, in the touch unit provided by at least one embodiment of the present disclosure, in a direction parallel to a the first plane, a planar shape of the first touch electrode is an axisymmetric pattern, a symmetry axis of the first touch electrode is parallel to an extension direction of the first touch electrode; an orthographic projection of the first interconnecting member on a second plane perpendicular to the first plane and passing through the extension direction is a first projection, an orthographic projection of the second interconnecting member on the second plane is a second projection, the first projection is at least partially overlapped with the second projection.

For example, in the touch unit provided by at least one embodiment of the present disclosure, the first interconnecting member and the second interconnecting member are located in a same layer and are insulated from each other, each of the first interconnecting member and the second interconnecting member comprises a curved portion, and the curved portions of the first interconnecting member and the second interconnecting member surround the first opening together, an orthographic projection of the first interconnecting member on a first plane where the touch unit is located has an annular shape or a partially annular shape, and an orthographic projection of the second interconnecting member on the first plane where the touch unit is located has an annular shape or a partially annular shapes.

For example, in the touch unit provided by at least one embodiment of the present disclosure, the orthographic projection of the first interconnecting member on the first plane where the touch unit is located has a partially annular shape; in a direction parallel to the first plane where the touch unit is located, a portion of the first interconnecting member overlapped with the second interconnecting member is electrically connected with the first touch electrode through the connecting bridge; and the connecting bridge spans the second interconnecting member; an inner side of the first interconnecting member and an inner side of a portion of the second interconnecting member not overlapped with the first interconnecting member in a direction parallel to the plane where the touch unit is located surround the first opening together.

For example, in the touch unit provided by at least one embodiment of the present disclosure, at least one of the first touch electrode and the second touch electrode is provided with one at least one second opening, and the at least one second opening comprises a curved line shape.

For example, the touch unit provided by at least one embodiment of the present disclosure further comprises a connecting bridge. An orthographic projection of the second interconnecting member on the first plane where the touch unit is located has an curved shape; the first interconnecting member is electrically connected with the first touch electrode through the connecting bridge, and an orthographic projection of the connecting bridge on the first plane where the touch unit is located spans the second interconnecting member.

At least one embodiment of the present disclosure provides a display device, comprising a display substrate and the touch structure described in the embodiment above, wherein the touch structure is located at a display side of the display substrate.

For example, the display device provided by at least one embodiment of the present disclosure further comprises an image acquiring device located at a side of the display substrate away from the touch structure. In a direction perpendicular to a plane where the display substrate is located, the image acquiring device is at least partly overlapped with the first opening of the touch unit, and the display substrate is configured to allow ambient light incident from the first opening to be transmitted through the display substrate so as to be incident into the image acquiring device.

For example, the display device provided by at least one embodiment of the present disclosure further comprises a polarized layer located between the display substrate and the touch structure.

At least one embodiment of the present disclosure provides a manufacturing method of a touch unit, comprising: forming a first touch electrode; forming a second touch electrode, the first touch electrode and the second touch electrode being intersected with each other and insulated from each other; forming a first interconnecting member, the first interconnecting member being formed to connect the first touch electrode; and forming a second interconnecting member, the second interconnecting member being formed to connect the second touch electrode, wherein at least one of the first interconnecting member or the second interconnecting member is formed to define a first opening.

For example, in the manufacturing method of the touch unit provided by at least one embodiment of the present disclosure, forming at least one of the first touch electrode or the second touch electrode comprises: depositing a conductive material film; performing a patterning process to the conductive material film to form at least two touch sub-electrodes spaced apart from each other, and forming at least one second opening in at least one touch sub-electrode of the at least two touch sub-electrodes.

BRIEF DESCRIPTION OF THE DRAWINGS

In order to more clearly illustrate the technical solution of the embodiments of the present disclosure, the drawings of the embodiments will be briefly described in the following. It is obvious that the described drawings are only related to some embodiments of the present disclosure and thus are not limitative of the disclosure.

DETAILED DESCRIPTION

Figure 1A:
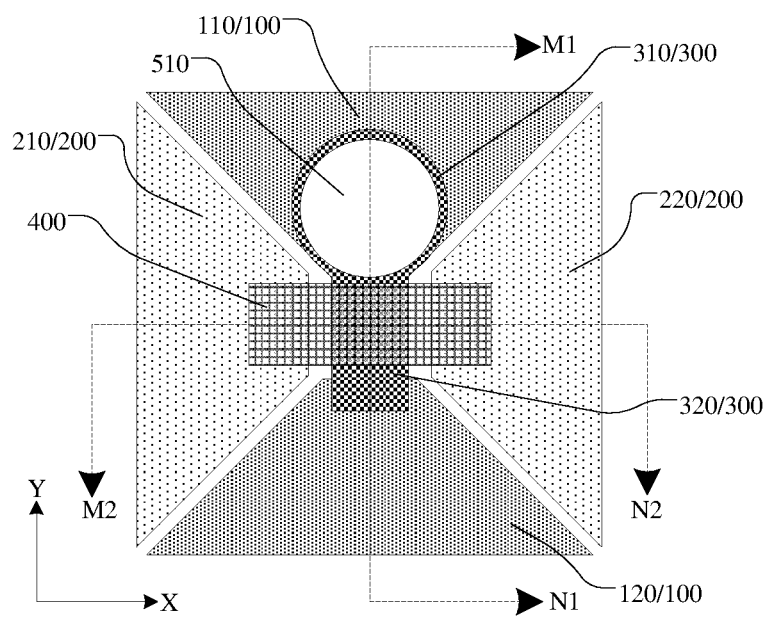
FIG. 1A is a plan view of a touch unit provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Existing electronic display products usually need to possess both touch function and photographed function. For example, a display side of a display panel may be provided with a touch structure (e.g., touch panel) to possess the touch function, and a side of the display panel away from the display side may be provided with a camera to possess the photographed function. In order to realize a narrow-bezel design of the display panel, the region where the touch panel is located is overlapped with the region where the camera is located, and the touch panel may degrade a transmittance to ambient light, resulting in negative influence to the photographed function of the camera (e.g., the definition of the environmental image as acquired is poor); if a hole is formed in a region of the display panel and the touch panel corresponding to the camera, it may damage an electrode in the touch panel, causing at least part of regions (e.g., regions of an entire row and/or regions of an entire column) of the touch panel to lose the touch function.

At least one embodiment of the present disclosure provides a touch unit, the touch unit includes a first touch electrode, a second touch electrode, a first interconnecting member and a second interconnecting member; the first touch electrode and the second touch electrode are insulated from each other and are arranged to be intersected with each other; the first interconnecting member is configured to electrically connect the first touch electrode, the second interconnecting member is configured to electrically connect the second touch electrode; at least one of the first interconnecting member or the second interconnecting member defines a first opening. The first opening may be configured to transmit light (e.g., ambient light), and the first touch electrode and the second touch electrode are electrically connected through the first interconnecting member and the second interconnecting member, respectively; as a result, the design of the first opening would not influence electrical performances of the first touch electrode and the second touch electrode, that is, the design of the first opening would not cause the touch unit and a touch structure (e.g., a touch panel) including such touch unit to lose a touch function.

Hereinafter, a touch unit and a manufacturing method thereof, a touch structure and a display device according to at least one embodiment of the present disclosure will be described in connection with the drawings. Moreover, as illustrated in FIG. 1A, FIG. 1B and FIG. 1C, a space rectangular coordinate system is established by taking a plane where the touch unit is located as a reference, so as to describe positions of structures in the touch unit or the like, wherein the X-axis and the Y-axis are parallel to the plane where the touch unit is located, and the Z-axis is perpendicular to the plane where the touch unit is located.

At least one embodiment of the present disclosure provides a touch unit. As illustrated in FIG. 1A, FIG. 1B and FIG. 1C, the touch unit includes a first touch electrode 100, a second touch electrode 200, a first interconnecting member 300 and a second interconnecting member 400; the first touch electrode 100 and the second touch electrode 200 are insulated from each other and are arranged to be intersected with each other; the first interconnecting member 300 is configured to electrically connect the first touch electrode 100, the second interconnecting member 400 is configured to electrically connect the second touch electrode 200; the first interconnecting member 300 defines a first opening 510. It should be explained that, the technical solution in which the first interconnecting member and the second interconnecting member define the first opening together or the second interconnecting member defines the first opening may be referred to the related description in the following embodiments, without repeatedly explained here.

For example, in at least one embodiment of the present disclosure, each of the two touch electrodes in the touch unit is broken into two sub-electrodes at an intersection of the two touch electrodes, and the two sub-electrodes in each of the two touch electrodes are connected through an interconnecting member. By way of example, as illustrated in FIG. 1A, FIG. 1B and FIG. 1C, the first touch electrode 100 includes two sub-electrodes spaced apart from each other, i.e., a first sub-electrode 110 and a second sub-electrode 120; the second touch electrode 200 includes two sub-electrodes spaced apart from each other, i.e., a third sub-electrode 210 and a fourth sub-electrode 220. The first sub-electrode 110 and the second sub-electrode 120 are electrically connected through the first interconnecting member 300; the third sub-electrode 210 and the fourth sub-electrode 220 are electrically connected through the second interconnecting member 400. The first interconnecting member 300 and the second interconnecting member 400 are intersected with each other and are insulated from each other. For example, in the touch unit provided by at least one embodiment of the present disclosure, on a plane where the touch unit is located, an orthographic projection of each of the first touch electrode, the second touch electrode, the first interconnecting member and the second interconnecting member is located outside an orthographic projection of the first opening. By way of example, as illustrated in FIG. 1A, FIG. 1B and FIG. 1C, in a plane determined by the X-axis and the Y-axis, the orthographic projection of each of the first touch electrode 100, the second touch electrode 200, the first interconnecting member 300 and the second interconnecting member 400 is located outside the orthographic projection of the first opening 510. In this way, the electrode structure in the touch unit would not block the light incident from the first opening 510, resulting in a high light transmittance at the first opening 510 of the touch unit.

Figure 1B:
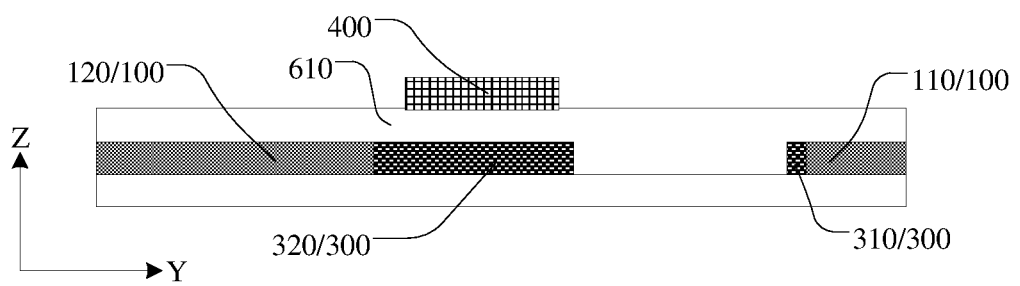
FIG. 1B is a sectional view of the touch unit illustrated in FIG. 1A along M1-N1.
Figure 1C:
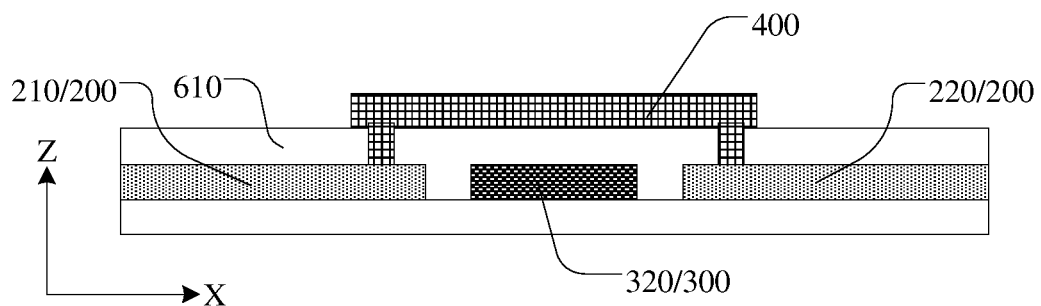
FIG. 1C is a sectional view of the touch unit illustrated in FIG. 1A along M2-N2.

It should be explained that, in at least one embodiment of the present disclosure, the first touch electrode and the second touch electrode of the touch unit may be located in a same layer (as illustrated in FIG. 1A, FIG. 1B and FIG. 1C), and may also be located in different layers. For example, in the case where the first touch electrode and the second touch electrode are located in a same layer, the first touch electrode may be disposed in a same layer and made of a same material with the first interconnecting member, the second touch electrode may be disposed in a same layer and made of a same material with the second interconnecting member. For example, in at least one embodiment of the present disclosure, in the case where two structures are located in a same layer and made of a same material, the two structures may be formed by a patterning process from a same film layer.

Hereinafter, the technical solution of at least one embodiment below will be described with reference to the case where the first touch electrode and the second touch electrode are disposed in a same layer, by way of example.

For example, in at least one embodiment of the present disclosure, as illustrated in FIG. 1A, FIG. 1B and FIG. 1C, the first touch electrode 100, the second touch electrode 200 and the first interconnecting member 300 are located in a same layer; the second interconnecting member is located in another layer; these two layers are spaced by a first insulating layer 610. For example, the first insulating layer 610 is provided with a via hole, and the second touch electrode 200 is connected with the second interconnecting member 400 through the via hole.

In at least one embodiment of the present disclosure, depending on the position of the first opening in the touch unit, the first opening may be surrounded by one of or both of the first interconnecting member and the second interconnecting member. Hereinafter, several arrangement manners of the first touch electrode, the second touch electrode, the first interconnecting member and the second interconnecting member in the touch unit are described, respectively, in connection with different positions of the first opening in the touch unit.

For example, in the touch unit provided by at least one embodiment of the present disclosure, the first interconnecting member includes a curved portion, and an inner side of the curved portion surrounds at least part of the first opening. For example, a portion of the first opening is surrounded by the inner side of the curved portion of the first interconnecting member, and the other portion of the first opening fills a gap between the first touch electrode and the second touch electrode or is surrounded by an inner side of the second interconnecting member; or, the first opening is surrounded by the inner side of the curved portion of the first interconnecting member. By way of example, as illustrated in FIG. 1A, the first interconnecting member 300 includes a curved portion 310, and an inner side of the curved portion 310 surrounds the first opening 510. For example, the first interconnecting member 300 further includes an extension portion 320 connected with the curved portion 310; the first sub-electrode 110 of the first touch electrode 100 is connected with the curved portion 310; the second sub-electrode 120 of the first touch electrode 100 is connected with the extension portion 320.

For example, in the touch unit provided by at least one embodiment of the present disclosure, an orthographic projection of the curved portion on the plane where the touch unit is located has an annular shape or a partially annular shape. For example, a portion of the first opening is surrounded by the inner side of the curved portion of the first interconnecting member, and the orthographic projection of the curved portion of the first interconnecting member on the plane where the touch unit is located has a partially annular shape; or, the first opening is surrounded by the inner side of the curved portion of the first interconnecting member, and the orthographic projection of the curved portion of the first interconnecting member on the plane where the touch unit is located has an annular shape. By way of example, as illustrated in FIG. 1A, the orthographic projection of the curved portion 310 of the first interconnecting member 300 on the X-Y plane has an annular shape, and the first opening 510 is entirely surrounded by the inner side of the first interconnecting member 300.

For example, in the touch unit provided by at least one embodiment of the present disclosure, on the plane where the touch unit is located, an orthographic projection of the second interconnecting member has a line shape, the line shape may be a straight-line segment and may also be a curved section. By way of example, as illustrated in FIG. 1A, the first opening 510 is surrounded by the inner side of the curved portion 310 of the first interconnecting member 300, and the second interconnecting member 400 has a planar shape of straight-line segment. In this way, the second interconnecting member 400 has a simple structure, which can simplify a manufacturing process of the touch unit.

Figure 2A:
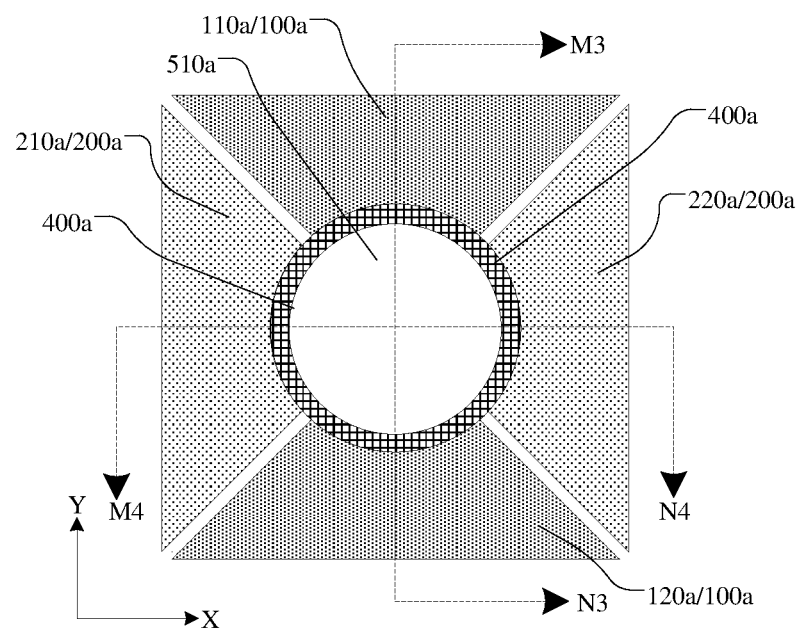
FIG. 2A is a plan view of another touch unit provided by some embodiments of the present disclosure.
Figure 2B:
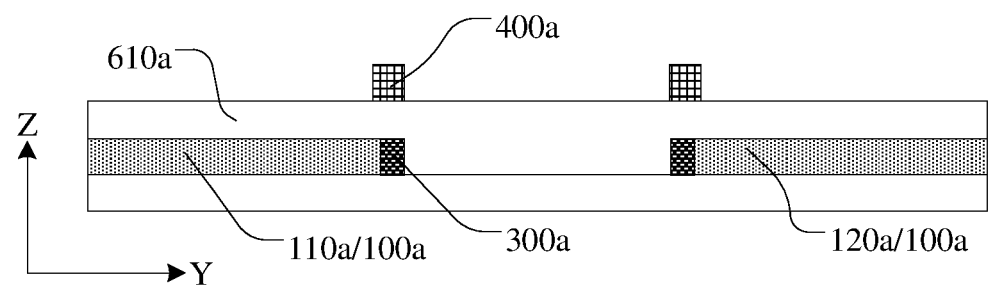
FIG. 2B is a sectional view of the touch unit illustrated in FIG. 2A along M3-N3.
Figure 2C:
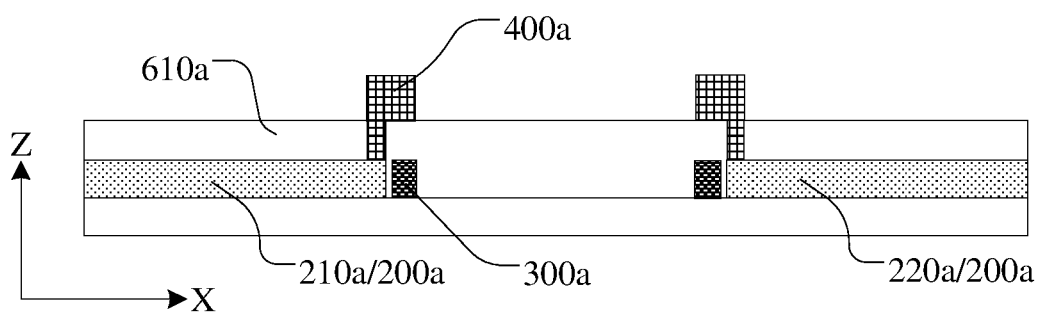
FIG. 2C is a sectional view of the touch unit illustrated in FIG. 2A along M4-N4.

For example, in the touch unit provided by at least one embodiment of the present disclosure, the first interconnecting member and the second interconnecting member are located in different layers and are insulated from each other; each of the first interconnecting member and the second interconnecting member includes a curved portion, and an inner side of the curved portion defines at least part of the first opening. By way of example, as illustrated in FIG. 2A, FIG. 2B and FIG. 2C, a first touch electrode 100a (including a first sub-electrode 110a and a second sub-electrode 120a therein), a second touch electrode 200a (including a third sub-electrode 210a and a fourth sub-electrode 220a therein) and a first interconnecting member 300a are located in a same layer, a second interconnecting member 400a is located in another layer; these two layers are spaced by a first insulating layer 610a; each of the first interconnecting member 300a and the second interconnecting member 400a includes a curved portion; and an inner side of the curved portion of the first interconnecting member 300a and an inner side of the curved portion of the second interconnecting member 400a define a first opening 510a together.

For example, in the touch unit provided by at least one embodiment of the present disclosure, an orthographic projection of the curved portion on the plane where the touch unit is located has an annular shape or a partially annular shape. By way of example, as illustrated in FIG. 2A, FIG. 2B and FIG. 2C, on the X-Y plane, orthographic projections of the first interconnecting member 300a and the second interconnecting member 400a both have an annular shape.

Figure 3:
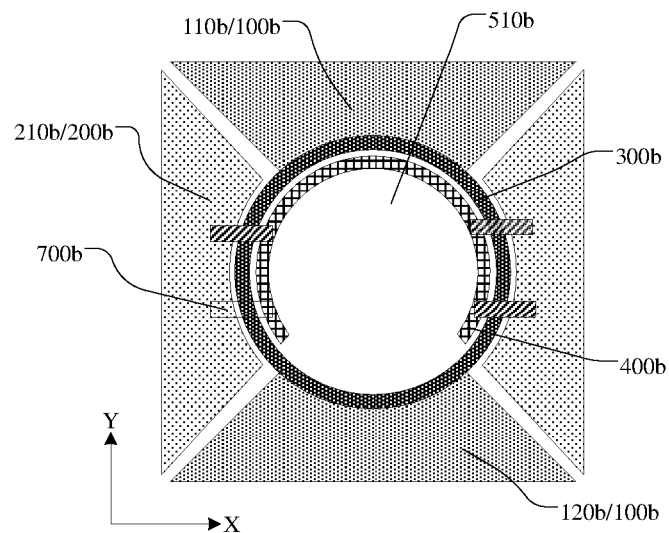
FIG. 3 is a plan view of another touch unit provided by some embodiments of the present disclosure.

For example, in the touch unit provided by at least one embodiment of the present disclosure, the first interconnecting member and the second interconnecting member are located in a same layer and are insulated from each other; each of the first interconnecting member and the second interconnecting member includes a curved portion so as to surround a first opening together. By way of example, as illustrated in FIG. 3, a first interconnecting member 300b and a second interconnecting member 400b are located in a same layer and are spaced apart from each other; each of the first interconnecting member 300b and the second interconnecting member 400b includes a curved portion so as to surround a first opening 510b together. In this way, the first interconnecting member 300b and the second interconnecting member 400b may be formed by a patterning process from a same film layer, which simplifies the manufacturing process of the touch unit. For example, on this basis, a first touch electrode 100b (including a first sub-electrode 110b and a second sub-electrode 120b therein), a second touch electrode 200b (including a third sub-electrode 210b and a fourth sub-electrode 220b therein), the first interconnecting member 300b and the second interconnecting member 400b are located in a same layer, so as to be formed by a patterning process from a same film layer, thereby further simplifying the manufacturing process of the touch unit.

For example, in the touch unit provided by at least one embodiment of the present disclosure, a planar shape of one of the first interconnecting member and the second interconnecting member located at the inner side is a partially annular shape, and a planar shape of the other one located at the outer side is an annular shape or a partially annular shape. In this way, the first opening can be surrounded by the first interconnecting member and the second interconnecting member together. For example, the second interconnecting member is located at the inner side of the first interconnecting member; an orthographic projection of the first interconnecting member on the plane where the touch unit is located has an annular shape or a partially annular shape; and an orthographic projection of the second interconnecting member on the plane where the touch unit is located has a partially annular shape.

For example, the touch unit provided by at least one embodiment of the present disclosure further includes a connecting bridge, wherein an orthographic projection of the first interconnecting member on the plane where the touch unit is located has an annular shape, the second interconnecting member is located at the inner side of the first interconnecting member, the second interconnecting member is electrically connected with the second touch electrode through the connecting bridge, and the connecting bridge spans the first interconnecting member. For example, an inner side of the second interconnecting member and an inner side of a portion of the first interconnecting member not overlapped with the second interconnecting member in a direction parallel to the plane where the touch unit is located surround the first opening together. By way of example, as illustrated in FIG. 3, the second interconnecting member 400*b* is located at the inner side of the first interconnecting member 300*b*; a planar shape of the first interconnecting member 300*b* is an annular shape; a planar shape of the second interconnecting member 400*b* is a partially annular shape; the third sub-electrode 210*b* and the fourth sub-electrode 220*b* are connected with the second interconnecting member 400*b* through the connecting bridge 700*b*. For example, an inner side of a pattern constituted by the first interconnecting member 300*b* and the second interconnecting member 400*b* surrounds the first opening 510*b*; that is, in a direction parallel to the X-Y plane, an inner side of the second interconnecting member 400*b* and an inner side of a portion of the first interconnecting member 300*b* not overlapped with the second interconnecting member 400*b* surround the first opening 510*b* together. For example, the first sub-electrode 110*a*, the second sub-electrode 120*b* and the first interconnecting member 300*b* are formed as an integral structure. For example, the connecting bridge 700*b* and the first interconnecting member 300*b* are located in different layers so as to be insulated from each other.

In the embodiment of the present disclosure, the amount, the size and the like of the connecting bridge may be designed according to an actual resistance of the touch electrode and a visibility effect of the connecting bridge, without limited here.

Figure 4:
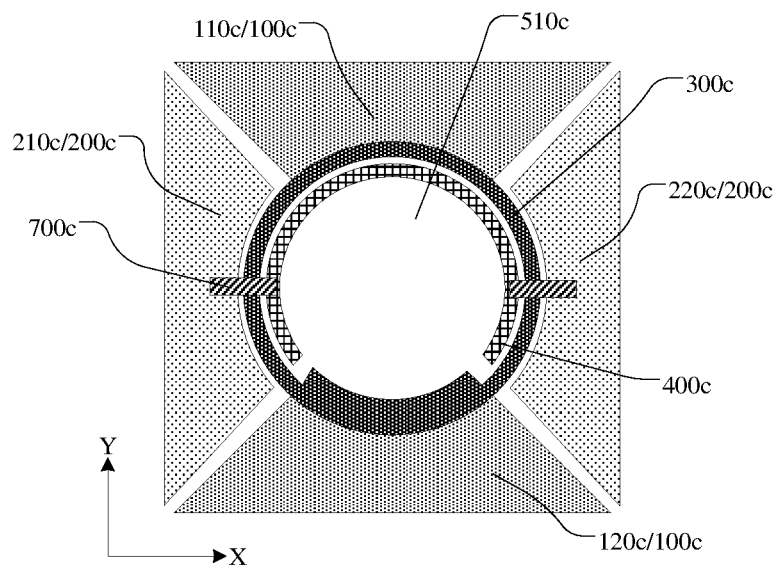
FIG. 4 is a plan view of another touch unit provided by some embodiments of the present disclosure.

For example, in at least one embodiment of the present disclosure, in the case where the first interconnecting member and the second interconnecting member surround the first opening together, in a region where the two interconnecting members are not overlapped, one of the two interconnecting members located at the outer side may be increased in its width to fill a gap left by the other one located at the inner side, so that the first opening surrounded by the first interconnecting member and the inner side of the second interconnecting member has a regular shape (e.g., substantially round shape). By way of example, as illustrated in FIG. 4, a first interconnecting member 300*c* and a second interconnecting member 400*c* are located in a same layer and are spaced apart from each other; the second interconnecting member 400*c* is located at the inner side of the first interconnecting member 300*c*; each of the first interconnecting member 300*c* and the second interconnecting member 400*c* includes a curved portion so as to surround a first opening 510*c* together; a planar shape of the first interconnecting member 300*c* is an annular shape; a planar shape of the second interconnecting member 400*c* is a partially annular shape, that is, a portion of the second interconnecting member 400*c* not overlapped with the first interconnecting member 300*c* is a gap of the second interconnecting member 400*c*. In a portion of the first interconnecting member 300*c* overlapped with the second interconnecting member 400*c*, the first interconnecting member 300*c* has a width greater than that of the other portions of the first interconnecting member 300*c*, so that the first opening surrounded by the first interconnecting member 300*c* and the inner side of the second interconnecting member 400*c* has a round shape. It should be explained that, arrangement manners of the first touch electrode 100*c* (including a first sub-electrode 110*c* and a second sub-electrode 120*c* therein), the second touch electrode 200*c* (including a third sub-electrode 210*c* and a fourth sub-electrode 220*c* therein) and the connecting bridge 700*c* may be referred to that of the first touch electrode 100*b*, the second touch electrode 200*b* and the connecting bridge 700*b* as illustrated in FIG. 3.

Figure 5:
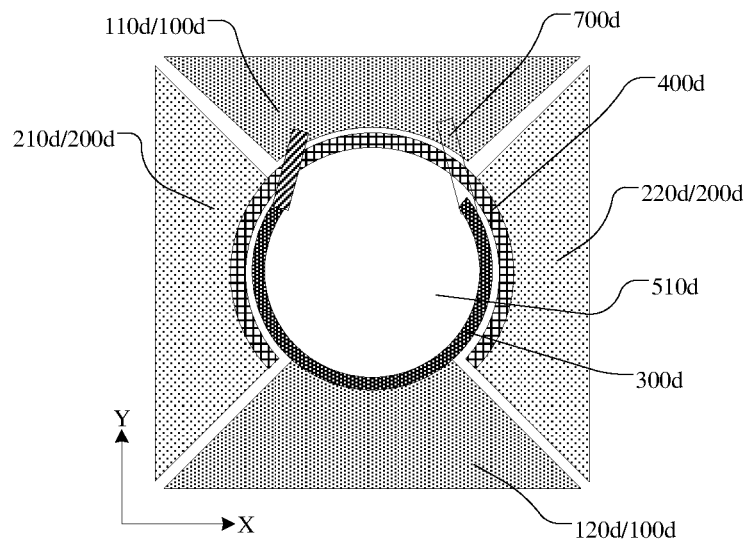
FIG. 5 is a plan view of another touch unit provided by some embodiments of the present disclosure.

For example, the touch unit provided by at least one embodiment of the present disclosure further includes a connecting bridge, wherein an orthographic projection of the first interconnecting member on the plane where the touch unit is located has a partially annular shape; a portion of the first interconnecting member is located at the inner side of the second interconnecting member; the first touch electrode includes two sub-electrodes spaced apart from each other; in a direction parallel to the plane where the touch unit is located, a portion of the first interconnecting member overlapped with the second interconnecting member is electrically connected with one sub-electrode of the first touch electrode through the connecting bridge, a portion of the first interconnecting member not overlapped with the second interconnecting member and the other sub-electrode of the first touch electrode are formed as an integral structure; and the connecting bridge spans the second interconnecting member. For example, an inner side of the first interconnecting member and an inner side of a portion of the second interconnecting member not overlapped with the first interconnecting member in a direction parallel to the plane where the touch unit is located surround a first opening together. By way of example, as illustrated in FIG. 5, a first interconnecting member 300*d* and a second interconnecting member 400*d* are located in a same layer and are spaced apart from each other; in a direction parallel to the X-Y plane (the plane where the touch unit is located), a portion of the first interconnecting member 300*d* is located at the inner side of the second interconnecting member 400*d*, that is, this portion of the first interconnecting member 300*d* is overlapped with the second interconnecting member 400*d*. Each of the first interconnecting member 300*d* and the second interconnecting member 400*d* includes a curved portion, so as to surround a first opening 510*d* together; and a planar shape of the first interconnecting member 300*d* is a partially annular shape, a planar shape of the second interconnecting member 400*d* is a partially annular shape. For example, an inner side of a pattern constituted by the first interconnecting member 300*d* and the second interconnecting member 400*d* surrounds the first opening 510*d*; that is, in the direction parallel to the X-Y plane, an inner side of the first interconnecting member 300*d* and an inner side of a portion of the second interconnecting member 400*d* not overlapped with the first interconnecting member 300*d* surround the first opening 510*d* together. A first sub-electrode 120*d* of a first touch electrode 100*d* is connected with the first interconnecting member 300*d* through a connecting bridge 700*d*; a second sub-electrode 120*d* of the first touch electrode 100*d* and the first interconnecting member 300*d* are formed as an integral structure. For example, a third sub-electrode 210*d* and a fourth sub-electrode 220*d* of a second touch electrode 200*d* and the second interconnecting member 400*d* are formed as an integral structure.

Figure 6:
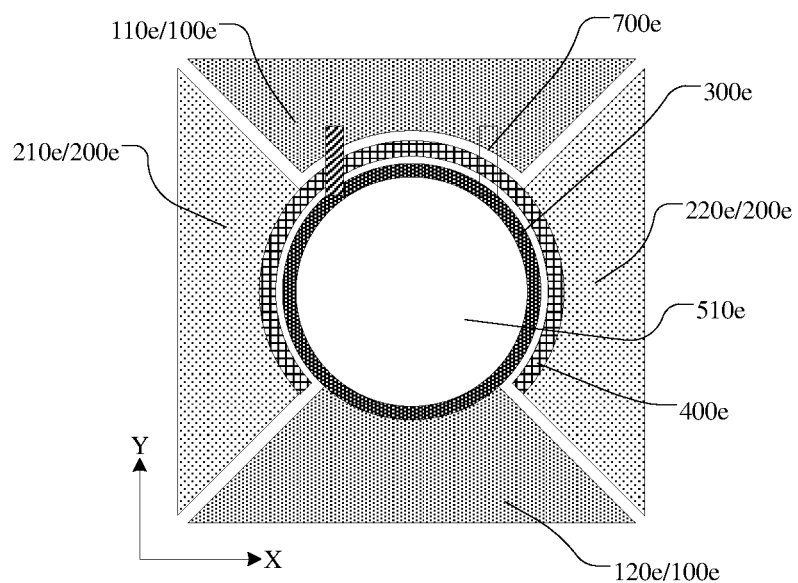
FIG. 6 is a plan view of another touch unit provided by some embodiments of the present disclosure.

For example, in the touch unit provided by at least one embodiment of the present, the first interconnecting member and the second interconnecting member are located in a same layer and are insulated from each other; each of the first interconnecting member and the second interconnecting member includes a curved portion; the second interconnecting member is located at the outer side of the first interconnecting member; an orthographic projection of the curved portion of the first interconnecting member on the plane where the touch unit is located has an annular shape; and an inner side of the curved portion of the first interconnecting member surrounds a first opening. In this way, the first opening is defined by the first interconnecting member alone. By way of example, as illustrated in FIG. 6, a first interconnecting member 300*e* and a second interconnecting member 400*e* are located in a same layer and are spaced apart from each other; the first interconnecting member 300*e* is located at the inner side of the second interconnecting member 400e; each of the first interconnecting member 300e and the second interconnecting member 400e includes a curved portion; a planar shape of the first interconnecting member 300e is an annular shape; and an inner side of the first interconnecting member 300e surrounds a first opening 510e.

For example, the touch unit provided by at least one embodiment of the present disclosure further includes a connecting bridge; a shape of an orthographic projection of the second interconnecting member on the plane where the touch unit is located is a partially annular shape; the first touch electrode includes two sub-electrodes spaced apart from each other; in a direction parallel to the plane where the touch unit is located, a portion of the first interconnecting member overlapped with the second interconnecting member is electrically connected with one sub-electrode of the first touch electrode through the connecting bridge, a portion of the first interconnecting member not overlapped with the second interconnecting member and the other sub-electrode of the first touch electrode are formed as an integral structure; and the connecting bridge spans the second interconnecting member. By way of example, as illustrated in FIG. 6, in a direction parallel to the X-Y plane (the plane where the touch unit is located), a portion of a first interconnecting member 300e is located at the inner side of a second interconnecting member 400e, that is, this portion of the first interconnecting member 300e is overlapped with the second interconnecting member 400e; a first sub-electrode 110e of a first touch electrode 100e is connected with the portion of the first interconnecting member 300e overlapped with the second interconnecting member 400e through a connecting bridge 700e; a second sub-electrode 120e of the first touch electrode 100e is connected with a portion of the first interconnecting member 300e not overlapped with the second interconnecting member 400e, for example, the second sub-electrode 120e and the first interconnecting member 300e are formed as an integral structure, that is, the second sub-electrode 120e and the first interconnecting member 300e may be formed by a patterning process from a same film layer. For example, a third sub-electrode 210e and a fourth sub-electrode 220e of a second touch electrode 200e and the second interconnecting member 400e are formed as an integral structure. The connecting bridge 700e and the second interconnecting member 400e are located in different layers so as to be insulated from each other.

Figure 7:
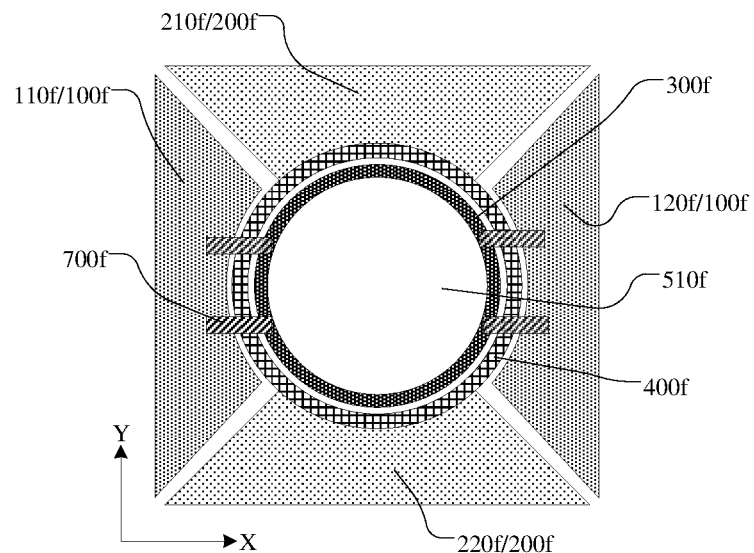
FIG. 7 is a plan view of another touch unit provided by some embodiments of the present disclosure.

For example, the touch unit provided by at least one embodiment of the present disclosure further includes a connecting bridge, an orthographic projection of the second interconnecting member on the plane where the touch unit is located has an annular shape, the first interconnecting member is electrically connected to the first touch electrode by the connecting bridge, and the connecting bridge spans the second interconnecting member. By way of example, as illustrated in FIG. 7, a first interconnecting member 300f and a second interconnecting member 400f are located in a same layer and are spaced apart from each other; the first interconnecting member 300f is located at the inner side of the second interconnecting member 400f; each of the first interconnecting member 300f and the second interconnecting member 400f includes a curved portion; a planar shape of the first interconnecting member 300f is an annular shape so as to surround a first opening 510f; a planar shape of the second interconnecting member 400f is an annular shape. A first sub-electrode 110f and a second sub-electrode 120f of a first touch electrode 100f are connected with the first interconnecting member 300f through a connecting bridge 700f. For example, a third sub-electrode 210f and a fourth sub-electrode 220f of a second touch electrode 200f and the second interconnecting member 400f are formed as an integral structure. The connecting bridge 700f and the second interconnecting member 400f are located in different layers so as to be insulated from each other.

In the embodiment of the present disclosure, the shape of the first opening is not limited, and may be designed according to actual demands. For example, in the touch unit provided by at least one embodiment of the present disclosure, the shape of the first opening may be one selected from the group consisted of a round shape, a triangle shape, a rectangle shape and a polygon shape, and may also be other shapes. For example, in the case where the first opening has a round shape, the incident ambient light is distributed uniformly, thereby improving a quality of an image acquired by the camera.

In the touch unit, a gap is existed between the first touch electrode and the second touch electrode, and the gap results in a difference in light transmittance of the touch unit. For example, a portion of the touch unit corresponding to this gap has a light transmittance greater than a region of the touch unit provided with an electrode, so that the gap is visible from the aspect of visual effect.

Figure 8:
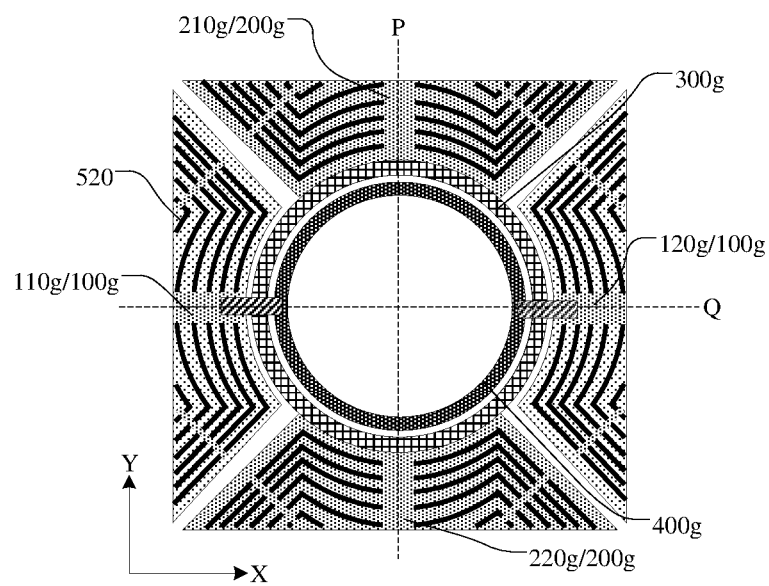
FIG. 8 is a plan view of another touch unit provided by some embodiments of the present disclosure.

For example, in the touch unit provided by at least one embodiment of the present disclosure, each of the first touch electrode and the second touch electrode includes two touch sub-electrodes spaced apart from each other, and at least one of the two touch sub-electrodes is provided with at least one second opening. By way of example, as illustrated in FIG. 8, in the touch unit, a first touch electrode 100g includes a first sub-electrode 110g and a second sub-electrode 120g; a second touch electrode 200g includes a third sub-electrode 210g and a fourth sub-electrode 220g; the first sub-electrode 110g, the second sub-electrode 120g, the third sub-electrode 210g and the fourth sub-electrode 220g are provided with a plurality of second openings 520. The sub-electrode above is broken at a region of the second opening 520, so that a region of the touch unit corresponding to the second opening 520 has a greater light transmittance; and from the aspect of visual effect, what is observed by human eyes is light with relatively uniformly distributed brightness, and the gap between the sub-electrodes is hard to be distinguished, that is, a shadow-eliminating effect is achieved; moreover, the light transmittance of the touch unit is improved.

For example, one of the first touch electrode and the second touch electrode is a driving electrode (TX), and the other one of the first touch electrode and the second touch electrode is a sensing electrode (RX); the TX electrode and the RX electrode are provided with a second opening, which can increase the amount of touch capacitive signal and improve the touch performance to a certain extent. On one hand, the arrangement of the second opening can decrease a reference capacitance, and hence can reduce a RC loading (wherein R represents a resistance, C represents a capacitance, Loading represents a charging time of an entire channel caused by R and C) and increase a touch scanning frequency; and on the other hand, the arrangement of the second opening can decrease a mutual capacitance between TXs or RXs, but a variation of the mutual capacitance between TXs or RXs when touched by a finger is not changed, thereby increasing a ratio of effective capacitance and improving a sensitivity of touch sense.

In the embodiment of the present disclosure, a planar shape of the second opening is not limited, and may be designed according to actual demands. For example, in the touch unit provided by some embodiments of the present disclosure, in a direction parallel to a plane where the touch sub-electrode is located, the planar shape of the second opening is a line shape. By way of example, as illustrated in FIG. 8, the planar shape of the second opening 520 is a line shape, and the line shape includes one of a straight-line segment and a curved section or a combination thereof. For example, in the touch unit provided by some other embodiments of the present disclosure, the planar shape of the second opening may be a round shape, a triangle shape, a rectangle shape or a polygon shape, and a plurality of second openings having the above-mentioned shapes may be arranged in an array in the sub-electrodes.

In the embodiment of the present disclosure, in the case where the second opening has a line shape, a width of a spaced distance between adjacent second openings may be configured as being not greater than 0.5 mm, for example, the width may be 0.2 mm, 0.3 mm, 0.4 mm or the like. A width of the second opening may be 1/20 to 1/3 of the spaced distance between adjacent second openings, for example, 1/10, 1/5, 1/4 or the like. For example, in at least one embodiment of the present disclosure, the width of the second opening is 0.01 mm-0.03 mm, and the spaced distance between adjacent second openings is 0.2 mm-0.4 mm Within the above-described value ranges, an obvious shadow-eliminating effect is achieved through the second opening. It should be explained that, parameters such as the width of the second opening may be designed according to actual process, and may not be limited to the above-described value ranges.

For example, in the touch unit provided by at least one embodiment of the present disclosure, in a direction parallel to the plane where the touch sub-electrode is located, the planar shape of the second opening is a straight-line segment shape (referring to the second opening 520 as illustrated in FIG. 8); or the planar shape of the second opening is a curved line shape; or the second opening includes at least two straight-line segments and at least one circular-arc curved section, the at least two straight-line segments are smoothly connected with two ends of the curved section, respectively.

Figure 9:
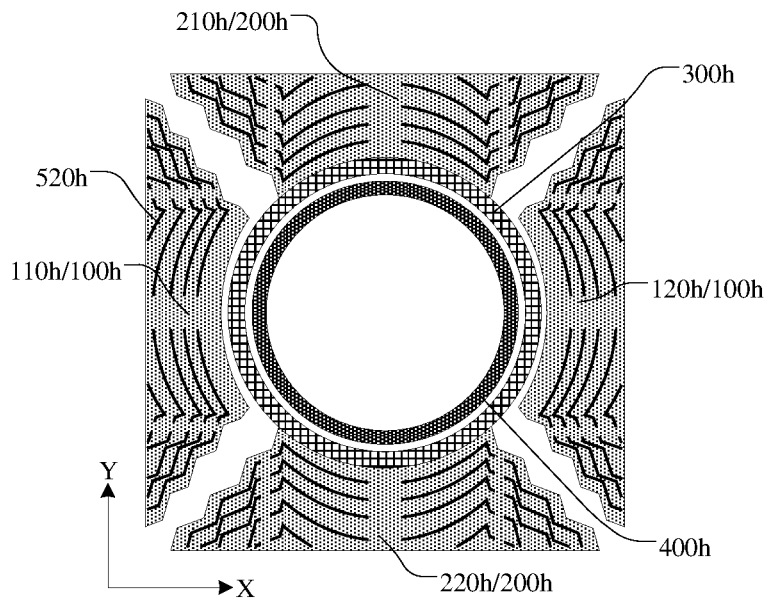
FIG. 9 is a plan view of another touch unit provided by some embodiments of the present disclosure.

For example, in some embodiments of the present disclosure, as illustrated in FIG. 9, a first touch electrode 100h includes a first sub-electrode 110h and a second sub-electrode 120h; a second touch electrode 200h includes a third sub-electrode 210h and a fourth sub-electrode 220h; the first sub-electrode 110h, the second sub-electrode 120h, the third sub-electrode 210h and the fourth sub-electrode 220h are provided with a plurality of second openings 520h. At least part of the second openings 520h have a curved line shape, and the curved line is consisted of a plurality of straight-line segments connected end to end.

Figure 10:
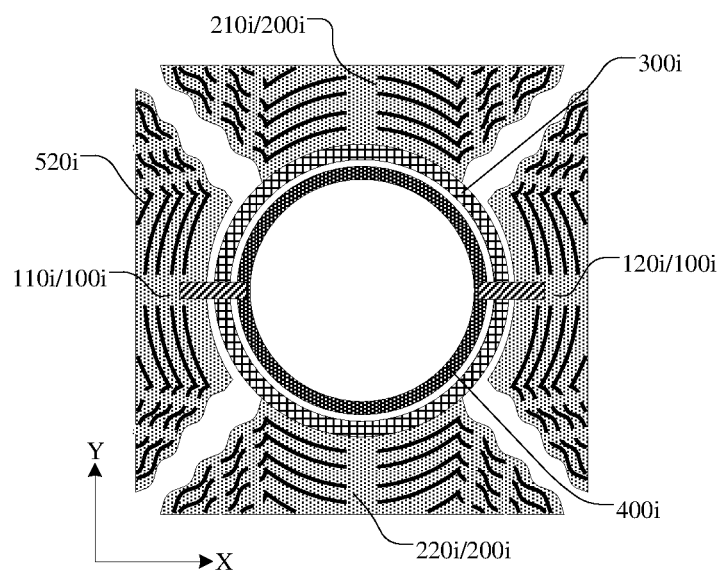
FIG. 10 is a plan view of another touch unit provided by some embodiments of the present disclosure.

For example, in some other embodiments of the present disclosure, as illustrated in FIG. 10, a first touch electrode 100i includes a first sub-electrode 110i and a second sub-electrode 120i; a second touch electrode 200i includes a third sub-electrode 210i and a fourth sub-electrode 220i; the first sub-electrode 110i, the second sub-electrode 120i, the third sub-electrode 210i and the fourth sub-electrode 220i are provided with a plurality of second openings 520i. At least part of the second openings 520i have a curved line shape, and a bending portion of the curved line is smoothly connected, for example, the bending portion of the curved line is a circular-arc shaped chamfer.

For example, in the touch unit provided by at least one embodiment of the present disclosure, in a direction parallel to the plane where the touch sub-electrode is located, a planar shape of the touch sub-electrode is an axisymmetric pattern, a symmetry axis of the touch sub-electrode is parallel to an extension direction of the touch sub-electrode; and in the touch sub-electrode provided with the second opening, the second opening is symmetrical about the symmetry axis. By way of example, as illustrated in FIG. 8, a symmetry axis of a first sub-electrode 110g and a second sub-electrode 120g in a first touch electrode 100g is a dotted line Q; and second openings 520 in the first sub-electrode 110g and the second sub-electrode 120g are distributed symmetrically about the dotted line Q. A symmetry axis of a third sub-electrode 210g and a fourth sub-electrode 220g in a second touch electrode 200g is a dotted line P, and second openings 520 in the third sub-electrode 210g and the fourth sub-electrode 220g are distributed symmetrically about the dotted line P. In this way, the second openings 520 in each of the sub-electrodes are distributed uniformly, so that the light transmittance of each of the sub-electrodes is distributed relatively uniformly; as a result, the second opening 520 is harder to be distinguished from the aspect of visual effect, thereby improving the shadow-eliminating effect. For example, the second openings in FIG. 9 and FIG. 10 are also distributed symmetrically about a symmetry axis of the touch sub-electrode provided with the second openings.

For example, in the touch unit provided by at least one embodiment of the present disclosure, a planar shape of the second opening is conformal with a contour line of the touch sub-electrode; and/or, a plurality of second openings is provided, and the plurality of openings are concentrically arranged in an annular shape by taking a centroid of the touch sub-electrode as a center. By way of example, as illustrated in FIG. 8, FIG. 9 and FIG. 10, the planar shape of the second opening is conformal with the contour line (an edge shape) of the touch sub-electrode. In this way, the second openings is each of the sub-electrodes are distributed more uniformly, which results in that the light transmittance of each of the sub-electrodes is distributed more uniformly, and that the second opening is harder to be distinguished from the aspect of visual effect, thereby improving the shadow-eliminating effect.

For example, in the case where the planar shape of the second opening is conformal with the contour line of the touch sub-electrode, as illustrated in FIG. 9, the second opening 520h has a curved line shape consisted of a plurality of straight-line segments, thus the edges of the sub-electrodes also have a curved line shape (e.g., a sawtooth shape) consisted of a plurality of straight-line segments. In this way, from the aspect of visual effect, it can reduce the risk that the gap between sub-electrodes may be distinguished, thereby improving the shadow-eliminating effect. Alternatively, as illustrated in FIG. 10, the second opening 520i has a shape of a plurality of curved lines, and the bending portions of the curved lines are all circular-arc shaped chamfers; thus the edges of the sub-electrodes and also the bending portions are all curved lines with circular-arc shaped chamfers (e.g., in a wave-like shape). In this way, from the aspect of visual effect, it can reduce the risk that the gap between sub-electrodes may be distinguished, thereby further improving the shadow-eliminating effect.

At least one embodiment of the present disclosure provides a touch structure, including the touch unit described in any of the foregoing embodiments. For example, the touch structure is a touch panel including a plurality of touch sub-regions, and one or more of the plurality of touch sub-regions is provided with the touch unit described in the foregoing embodiments.

Figure 11:
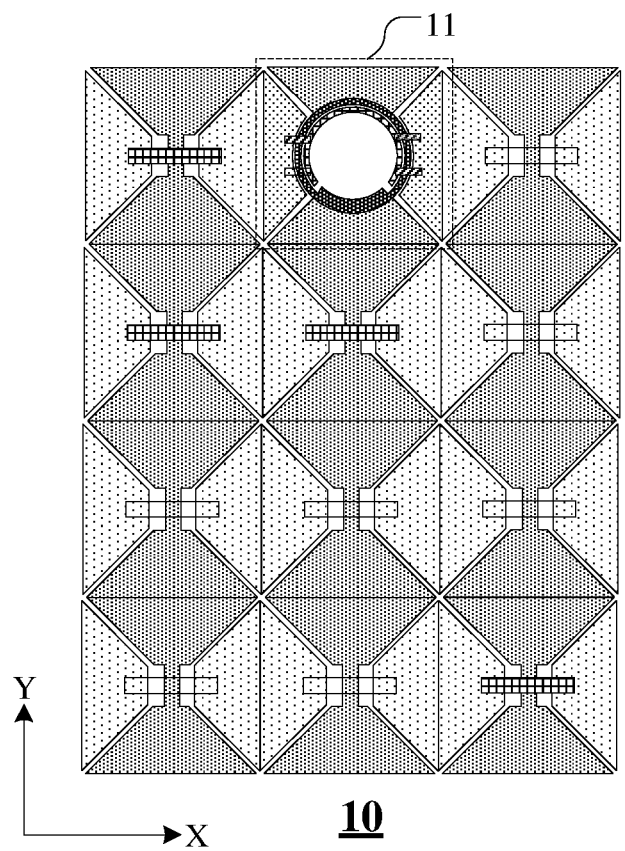
FIG. 11 is a plan view of a touch structure provided by some embodiments of the present disclosure.

By way of example, as illustrated in FIG. 11, the touch structure 10 includes a plurality of touch sub-regions, and one touch sub-region 11 is designed to include the touch unit in the foregoing embodiments.

It should be explained that, the touch unit in the touch sub-region 11 may be the touch unit of the embodiments as illustrated in FIGS. 8-10. Furthermore, sub-electrodes of the touch unit in other touch sub-regions may also be configured to have the second opening, and the arrangement manner of the second opening in the corresponding sub-electrode may be referred to the related description of the embodiments as illustrated in FIGS. 8-10 without repeatedly explained here.

At least one embodiment of the present disclosure provides a display device, including a display substrate and the touch structure described in the embodiment above. The touch structure is located at a display side of the display substrate.

Figure 12:
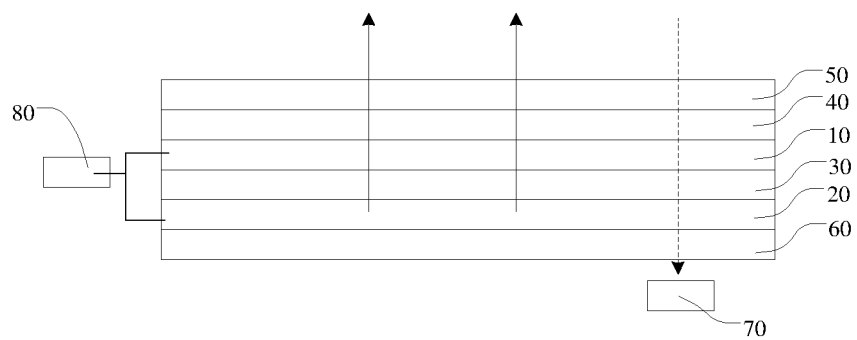
FIG. 12 is a sectional view of a display device provided by some embodiments of the present disclosure.

For example, in some embodiments of the present disclosure, as illustrated in FIG. 12, the display device includes a display substrate 20 and a touch structure 10; the touch structure 10 is located at a display side of the display substrate 20. For example, the display substrate is an organic light-emitting diode (OLED) display substrate.

For example, in some other embodiments of the present disclosure, the display device includes a display panel, and the touch structure is located at a display side of the display panel or disposed inside the display panel. For example, the display panel may be a liquid crystal display (LCD) display panel, an electronic paper display panel or the like. Hereinafter, the technical solution of the following embodiments of the present disclosure will be described with reference to the case where the display substrate included in the display device is an OLED display substrate, by way of example.

For example, the display device provided by at least one embodiment of the present disclosure further includes an image acquiring device. The image acquiring device is located at a side of the display substrate away from the touch structure; in a direction perpendicular to a plane where the display substrate is located, the image acquiring device is at least partly overlapped with the first opening of the touch unit, and the display substrate is configured to allow ambient light incident from the first opening to be transmitted through the display panel so as to be incident into the image acquiring device. By way of example, as illustrated in FIG. 12, the display device includes an image acquiring device 70, the image acquiring device 70 is located at a side of a display substrate 20 away from a touch structure 10; the image acquiring device 70 corresponds to a first opening (referring to the foregoing embodiments and related drawings) in a touch unit of the touch structure 10 to receive ambient light (as indicated by the dotted-line arrow in the figure), so that the display device is provided with an image acquiring function; furthermore, the touch unit in the touch structure 10 is provided with a first opening, resulting in high light transmittance to the ambient light, thereby improving a definition of an environment image acquired by the image acquiring device 70.

The display device may further include structures such as a polarizer plate to reduce a reflection of the ambient light, so as to reduce an influence to a displayed image resulted by the ambient light and to improve a contrast ratio of the displayed image. In an assembling process of the display device, the touch structure may be attached onto the display side of the display substrate prior to attaching structures such as the polarizer plate thereon, so as to eliminate the visibility of the gap between sub-electrodes in the touch structure to human eyes, thereby achieving the shadow-eliminating effect. The bonding process of the touch structure needs to use an optical adhesive (e.g., bottom optically clear adhesive, abbreviated as B-OCA), the optical adhesive has a larger thickness (about 0.1 mm) and is unfavorable for a thinner and lighter design of the display device; moreover, the touch structure is covered by the polarizer plate, thus during a touch operation such as fingerprint recognition, there is a larger spaced distance between the touch structure and the finger or the like, which restricts a sensitivity and an accuracy of the touch structure.

For example, the display device provided by at least one embodiment of the present disclosure further includes a polarizer layer, the polarizer layer is located between the display substrate and the touch structure. By way of example, as illustrated in FIG. 12, a polarizer layer 30 is located between a display substrate 20 and a touch structure 10. A sub-electrode of the touch structure 10 may be provided with a second opening as illustrated in FIGS. 8-10, thus the gap between the sub-electrode in the touch structure 10 is hard to be distinguished from the aspect of visual effect, and a good shadow-eliminating effect may be achieved by itself; the touch structure 10 can cover the polarizer layer 30. In this way, during an operation such as touch operation, the touch structure 10 is close to the finger or the like, resulting in high sensibility and accuracy; moreover, in an actual manufacturing process, the polarizer layer 30 of the finished product is usually coated with an adhesive layer (e.g., pressure-sensitive adhesive, abbreviated as PSA) on both sides, therefore, during sequentially bonding the polarizer layer 30, the touch structure 10 and the like onto the display substrate 20, the above-mentioned B-OCA optical adhesive layer may not be required, which is favorable for the thinner and lighter design of the display device.

For example, the polarizer layer may include quarter wave plate, half-wave plate, polarizer plate and other optical films.

For example, as illustrated in FIG. 12, the display device may further include an encapsulated cover 50, the encapsulated cover 50 is bonded onto the touch structure 10 through an optical adhesive 40 (e.g., top optically clear adhesive, abbreviated as T-OCA). For example, the encapsulated cover 50 may be a rigid cover, and may also be configured as a flexible cover to be applied to flexible display. For example, a material of a flexible, encapsulated cover 50 may include one or more selected from the group consisted of polyimide, polycarbonate, polyacrylic ester, polyetherimide (PEI), polyether sulfone (PES), polyethylene terephthalate (PET) and polyethylene terephthalate.

For example, in at least one embodiment of the present disclosure, as illustrated in FIG. 12, a side of the display substrate 20 away from the display side is provided with a cushion structure 60. For example, the display substrate may be configured as a flexible substrate so that the display device may be applicable for flexible display. The cushion structure 60 may provide the display device with buffering and supporting. For example, the cushion structure 60 may be a foam (SCF) or the like.

For example, the display device provided by at least one embodiment of the present disclosure further includes a controller, the controller may be in signal connection with the touch structure and the display substrate. By way of example, as illustrated in FIG. 12, the display device includes a controller 80, for example, the controller 80 includes a chip. The chip may be in signal connection with the touch structure and the display substrate by way of bonding. For example, the chip may be disposed on a flexible circuit board. For example, the display substrate is an OLED display substrate, the chip may be in signal connection with, for example, a pixel driving circuit or the like in the display substrate, so as to control a light-emitting function of an organic light-emitting device. For example, in a manufacturing process of the display device, a bonding process may be utilized to connect the flexible circuit board provided with the chip to a contact pad in an external circuit region of the display substrate, and a signal line of the touch structure may also be indirectly connected, through other structures, to the contact pad so as to be connected to the chip of the flexible circuit board.

For example, the chip of the controller may be a central processing unit, a digital signal processor, a single chip microcomputer, a programmable logic controller or the like. For example, the chip may also include a memory, and may further include a power source module or the like, and realizes functions of power supply, signal input and signal output through additionally provided wires, signal lines or the like. For example, the chip may further include a hardware circuit, computer-executable codes or the like. The hardware circuit may include a conventional, very-large-scale integration (VLSI) circuit or a gate array, and existing semiconductors such as logic chip and transistor, or other separately disposed elements; the hardware circuit may further include a field-programmable gate array (FPGA), a programmable array logic (PAL), a programmable logic device or the like.

For example, the display device may be any product or component having display function such as a television, a digital camera, a mobile phone, a watch, a tablet computer, a notebook computer and a navigation device.

It should be explained that, for the clarity of illustration, not all the structures of the display device in at least one embodiment are presented in the present disclosure. In order to achieve necessary function(s) of the display device, one skilled in the art may arrange other structures (e.g., an optical splitter to realize glasses-free 3D display, or others) according to particular application scenarios, without limited in the embodiments of the present disclosure.

At least one embodiment of the present disclosure provides a manufacturing method of a touch unit, including: forming a first touch electrode; forming a second touch electrode, the first touch electrode and the second touch electrode being intersected with each other and insulated from each other; forming a first interconnecting member, the first interconnecting member being formed to connect the first touch electrode; and forming a second interconnecting member, the second interconnecting member being formed to connect the second touch electrode, wherein at least one of the first interconnecting member or the second interconnecting member is formed to define a first opening. In the touch unit manufactured by using this method, the first opening may be configured to transmit light (e.g., ambient light); furthermore, the first touch electrode and the second touch electrode are electrically connected through the first interconnecting member and the second interconnecting member, respectively; thus the design of the first opening would not influence the electrical performance of the first touch electrode and the second touch electrode, that is, the design of the first opening would not cause the touch unit and the touch structure (e.g., touch panel) including such touch unit to lose the touch function.

For example, the manufacturing method of the touch unit provided by at least one embodiment of the present disclosure further includes: forming each of the first touch electrode and the second touch electrode to include two touch sub-electrodes spaced apart from each other, and forming at least one of the touch sub-electrodes to have at least one second opening. The second opening allows a region of the touch unit corresponding to the second opening to have a greater light transmittance; from the aspect of visual effect, what is observed by the human eyes is relatively, uniformly distributed light, which makes it hard to distinguish the gap between sub-electrodes, that is, the shadow-eliminating effect is achieved; moreover, the light transmittance of the touch unit is improved.

For example, in the manufacturing method of the touch unit provided by at least one embodiment of the present disclosure, forming at least one of the first touch electrode or the second touch electrode includes: depositing a conductive material film; performing a patterning process to the conductive material film to form at least two touch sub-electrodes spaced apart from each other, and forming at least one second opening in at least one of the at least two touch sub-electrodes. For example, in the case where the first touch electrode and the second touch electrode are located in a same layer, a conductive material film may be utilized to form four touch sub-electrodes, so as to form the first touch electrode and the second touch electrode; each of the first touch electrode and the second touch electrode includes two touch sub-electrodes. For example, in the case where the first touch electrode and the second touch electrode are located in different layers, the above-mentioned conductive material film may be a first conductive material film, and in this manufacturing method, a second conductive material film may be further deposited, and a second patterning process may be performed to the second conductive material film to form at least two touch sub-electrodes; the first conductive material film may be utilized to form two touch sub-electrodes so as to form one of the first touch electrode and the second touch electrode, and the second conductive material film may be utilized to form two touch sub-electrodes so as to form the other one of the first touch electrode and the second touch electrode. The touch unit obtained by using this method may be referred to the related description in the foregoing embodiments, without repeatedly explained here.

For example, in the manufacturing method of the touch unit provided by at least one embodiment of the present disclosure, in a direction parallel to a plane where the touch sub-electrode is located, the second opening is formed to have a planar shape of straight-line segment; or the second opening is formed to have a planar shape of curved line; or the second opening is formed to include at least two straight-line segments and at least one circular-arc shaped curved section, the at least two straight-line segments are smoothly connected with two ends of the curved section, respectively. The structure of the touch unit obtained by using the above-described method may be referred to the related description in the foregoing embodiments (the embodiments as illustrated in FIG. 8, FIG. 9 and FIG. 10), without repeatedly explained here.

The structure of the touch unit obtained by using the above-described manufacturing method may be referred to the related description in the foregoing embodiments (as illustrated in FIGS. 1A-1C, FIGS. 2A-2C and FIGS. 3-10), without repeatedly explained here.

Hereinafter, in an example of the embodiment of the present disclosure, the technical solution of the following at least one embodiment of the present disclosure will be described with reference to the case of manufacturing the touch unit as illustrated in FIG. 4, by way of example.

Figure 13A:
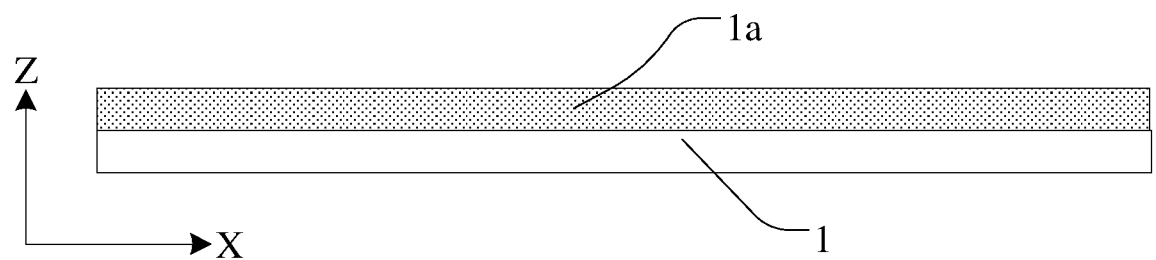
FIGS. 13A-13D are schematic diagrams illustrating process steps of a manufacturing method of a touch unit provided by some embodiments of the present disclosure.

As illustrated in FIG. 13A, a base substrate 1 is provided, and a conductive material film 1a is deposited on the base substrate 1. For example, the conductive material film 1a is of a transparent material. For example, the transparent material may include tin indium oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) or the like.

Figure 13B:
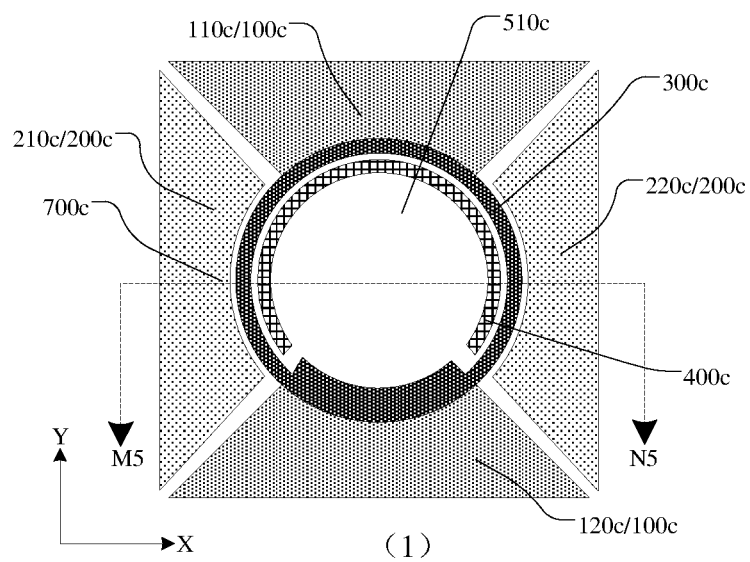
Figure 13B:
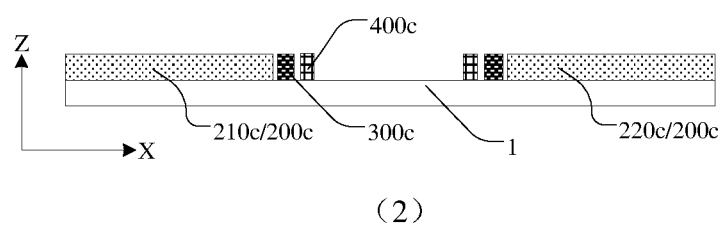

As illustrated in FIG. 13B, a patterning process is performed to the conductive material film 1a to form a first touch electrode 100c (including a first sub-electrode 110c and a second sub-electrode 120c therein), a second touch electrode 200c (including a third sub-electrode 210c and a fourth sub-electrode 220c therein), a first interconnecting member 300c and a second interconnecting member 400c. In FIG. 13B, FIG. 1) is a plan view and FIG. 2) is a sectional view of FIG. 1) along M5-N5. For example, during the patterning process performed to the conductive material film 1a, second openings may further be formed in a plurality of sub-electrodes, and the distribution and the shape of the second openings may be referred to the related description in the foregoing embodiments (e.g., the embodiments as illustrated in FIGS. 8-10), without repeatedly explained here.

Figure 13C:
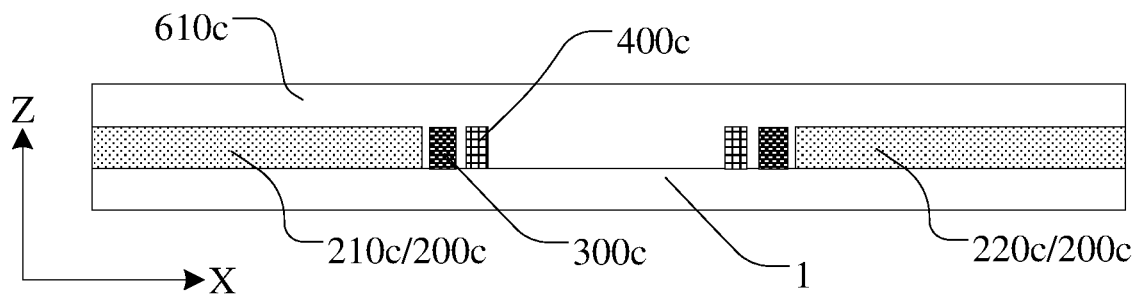

As illustrated in FIG. 13C, an insulating material is deposited on the base substrate 1 to form a first insulating layer 610c, the first insulating layer 610c covers the first touch electrode 100c and the second touch electrode 200c. For example, in some embodiments of the present disclosure, the first insulating layer 610c may be configured as an entire-layered structure to cover all electrode structures in the touch unit which are located in a same layer with the touch electrode, as illustrated in FIG. 13C; for example, the first insulating layer 610c may be configured as a planarization layer. For example, in some other embodiments of the present disclosure, the first insulating layer may also be formed to cover the first interconnecting member only, for example, it may be formed to merely cover a portion of the first interconnecting member located at the third sub-electrode and the second interconnecting member, and a portion of the first interconnecting member located at the fourth sub-electrode and the second interconnecting member.

For example, a material of the first insulating layer may include silicon oxide, silicon nitride, silicon oxynitride and the like.

Figure 13D:
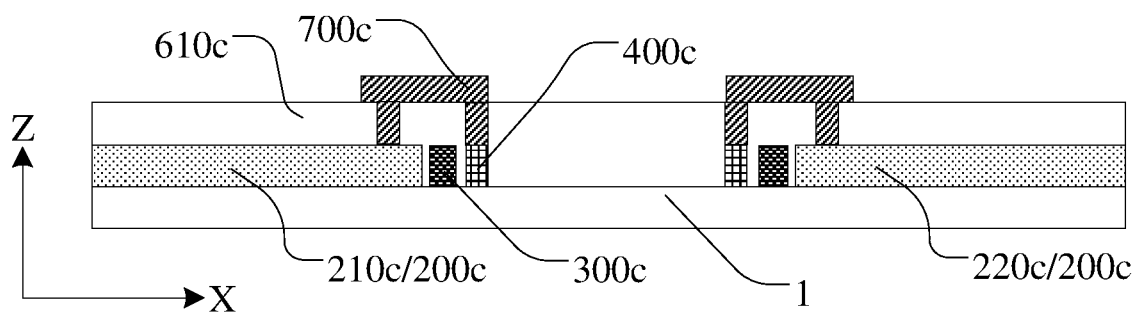

As illustrated in FIG. 13D, a via hole is formed in the first insulating layer 610c to expose the third sub-electrode 210c, the fourth sub-electrode 220c and the second interconnecting member 400c; a conductive material film layer is deposited on the first insulating layer 610c; a patterning process is conducted to the conductive material film layer to form a plurality of connecting bridges 700c, and the plurality of connecting bridges 700c are connected to the third sub-electrode 210c, the fourth sub-electrode 220c and the second interconnecting member 400c through the via hole in the first insulating layer 610c, so that the third sub-electrode 210c and the fourth sub-electrode 220c are electrically connected with the second interconnecting member 400c through different connecting bridges 700c. It should be explained that, FIG. 4 is a plan view of the touch unit as illustrated in FIG. 13D.

Hereinafter, in another example of the embodiment of the present disclosure, the technical solution of the following at least one embodiment of the present disclosure will be described with reference to the case of manufacturing the touch unit as illustrated in FIG. 8, by way of example.

Figure 14A:
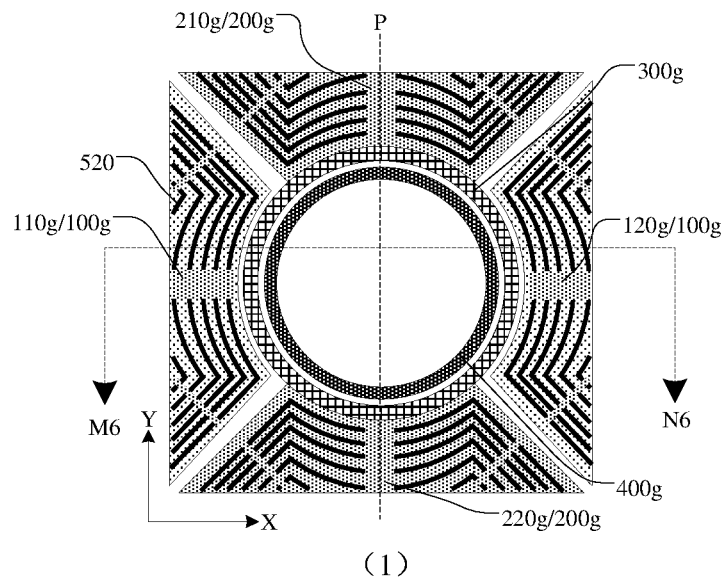
FIGS. 14A-14C are schematic diagrams illustrating process steps of a manufacturing method of another touch unit provided by some embodiments of the present disclosure.
Figure 14A:
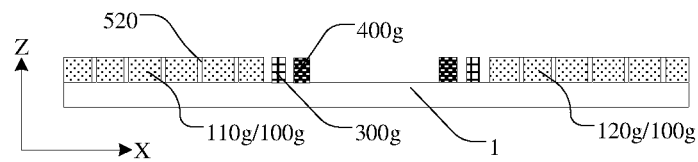

As illustrated in FIG. 14A, a base substrate 1 is provided, and a conductive material film 1a is deposited on the base substrate 1; then a patterning process is performed to the conductive material film 1a to form a first touch electrode 100g (including a first sub-electrode 110g and a second sub-electrode 120g therein), a second touch electrode 200g (including a third sub-electrode 210g and a fourth sub-electrode 220g therein), a first interconnecting member 300g and a second interconnecting member 400g. During the patterning process performed to the conductive material film 1a, second openings 520 are formed in a plurality of sub-electrodes, and the distribution and the shape of the second openings 520 may be referred to the related description in the foregoing embodiments (e.g., the embodiments as illustrated in FIGS. 8-10), without repeatedly explained here. In FIG. 14A, FIG. 1) is a plan view, and FIG. 2) is a sectional view of FIG. 1) along M6-N6.

For example, the conductive material film 1a is of a transparent material. For example, the transparent material may include tin indium oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) or the like.

Figure 14B:
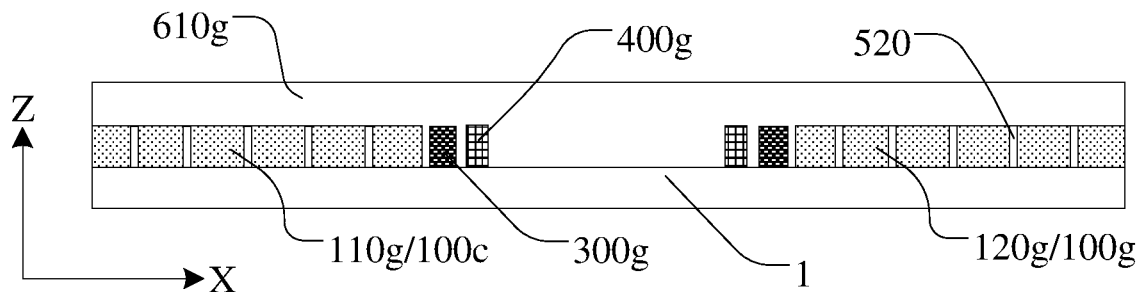

As illustrated in FIG. 14B, an insulating material is deposited on the base substrate 1 to form a first insulating layer 610g, the first insulating layer 610g covers the first touch electrode 100g and the second electrode 200g. For example, in some embodiments of the present disclosure, the first insulating layer 610g may be configured as an entire-layered structure to cover all electrode structures in the touch unit which are located in a same layer with the touch electrode, as illustrated in FIG. 14B; for example, the first insulating layer 610g may be configured as a planarization layer. For example, in some other embodiments of the present disclosure, the first insulating layer may also be formed to cover the first interconnecting member only, for example, it may be formed to merely cover a portion of the first interconnecting member located at the third sub-electrode and the second interconnecting member, and a portion of the first interconnecting member located at the fourth sub-electrode and the second interconnecting member. For example, a material of the first insulating layer may include silicon oxide, silicon nitride, silicon oxynitride or the like.

Figure 14C:
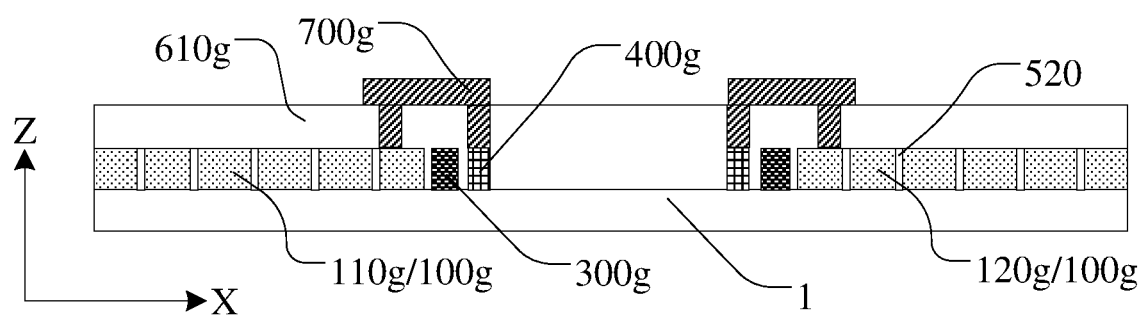

As illustrated in FIG. 14C, a via hole is formed in the first insulating layer 610g to expose the first sub-electrode 110g, the second sub-electrode 120g and the second interconnecting member 400g; a conductive material film layer is deposited on the first insulating layer 610g; a patterning process is performed to the conductive material film layer to form a plurality of connecting bridges 700g, and the plurality of connecting bridges 700g are connected to the third sub-electrode 210g, the fourth sub-electrode 220g and the second interconnecting member 400g through the via hole in the first insulating layer 610c, so that the third sub-electrode 210g and the fourth sub-electrode 220g are electrically connected with the second interconnecting member 400g through different connecting bridges 700g. It should be explained that, FIG. 8 is a plan view of the touch unit as illustrated in FIG. 14C.

For the present disclosure, the following statements should be noted:

(1) The drawings accompanying embodiment(s) of the present disclosure involve only the structure(s) in connection with the embodiment(s) of the present disclosure, and other structure(s) can be referred to common design(s).

(2) For purpose of clarity, in the drawings describing the embodiment(s) of the present disclosure, thickness(es) of layer(s) or region(s) may be enlarged or contracted, that is, the drawings are not drafted according to actual scales.

(3) In case of no conflict, the embodiments of the present disclosure or features in the embodiments can be combined to obtain new embodiment(s).

What are described above is the specific implementations of the present disclosure only and not limitative to the scope of the present disclosure; the scopes of the present disclosure should be defined in the appended claims.

The invention claimed is:

1. A touch unit, comprising:
   a first touch electrode and a second touch electrode insulated from each other, the first touch electrode and the second touch electrode being arranged to be intersected with each other;
   a first interconnecting member configured to electrically connect the first touch electrode; and
   a second interconnecting member configured to electrically connect the second touch electrode,
   wherein at least one of the first interconnecting member or the second interconnecting member defines a first opening, and the second interconnecting member is electrically connected with the second touch electrode directly,
   wherein the first interconnecting member and the second interconnecting member are located in a same layer and are insulated from each other,
   each of the first interconnecting member and the second interconnecting member comprises a curved portion, and the curved portions of the first interconnecting member and the second interconnecting member surround the first opening together,
   an orthographic projection of the first interconnecting member on a first plane where the touch unit is located has an annular shape or a partially annular shape, and
   an orthographic projection of the second interconnecting member on the first plane where the touch unit is located has an annular shape or a partially annular shape,
   wherein on a first plane where the touch unit is located, an inner side of the first interconnecting member partially surrounds the first opening,
   wherein an area of the first interconnecting member is smaller than an area of the second interconnecting member.

2. The touch unit according to claim 1, wherein on a first plane where the touch unit is located, an orthographic projection of each of the first touch electrode, the second touch electrode, the first interconnecting member and the second interconnecting member is located outside an orthographic projection of the first opening.

3. The touch unit according to claim 1, wherein the second interconnecting member comprises a left part, a right part and a top part, the left part, the right part and the top part are electrically connected.

4. The touch unit according to claim 3, wherein at least one of the left part and the right part is electrically connected with the top part directly.

5. The touch unit according to claim 3, wherein the first interconnecting member at least comprises a bottom part which is not overlapped with the top part.

6. The touch unit according to claim 1, wherein in a direction parallel to a the first plane, a planar shape of the first touch electrode is an axisymmetric pattern, a symmetry axis of the first touch electrode is parallel to an extension direction of the first touch electrode; an orthographic projection of the first interconnecting member on a second plane perpendicular to the first plane and passing through the extension direction is a first projection, an orthographic projection of the second interconnecting member on the second plane is a second projection, the first projection is at least partially overlapped with the second projection.

7. The touch unit according to claim 1, further comprising a connecting bridge, wherein
   the orthographic projection of the first interconnecting member on the first plane where the touch unit is located has a partially annular shape;
   in a direction parallel to the first plane where the touch unit is located, a portion of the first interconnecting member overlapped with the second interconnecting member is electrically connected with the first touch electrode through the connecting bridge; and
   the connecting bridge spans the second interconnecting member; an inner side of the first interconnecting member and an inner side of a portion of the second interconnecting member not overlapped with the first interconnecting member in a direction parallel to the plane where the touch unit is located surround the first opening together.

8. The touch unit according to claim 1, wherein at least one of the first touch electrode and the second touch electrode is provided with one at least one second opening, and the at least one second opening comprises a curved line shape.

9. The touch unit according to claim 1, further comprising a connecting bridge, wherein
   an orthographic projection of the second interconnecting member on the first plane where the touch unit is located has an curved shape; the first interconnecting member is electrically connected with the first touch electrode through the connecting bridge, and
   an orthographic projection of the connecting bridge on the first plane where the touch unit is located spans the second interconnecting member.

10. A display device, comprising a display substrate and the touch unit according to claim 1, wherein the touch structure is located at a display side of the display substrate.

11. The display device according to claim 10, further comprising:
   an image acquiring device located at a side of the display substrate away from the touch structure,
   wherein, in a direction perpendicular to a plane where the display substrate is located, the image acquiring device is at least partly overlapped with the first opening of the touch unit, and the display substrate is configured to allow ambient light incident from the first opening to be transmitted through the display substrate so as to be incident into the image acquiring device.

12. The display device according to claim 10, further comprising:
   a polarized layer located between the display substrate and the touch structure.

13. A manufacturing method of a touch unit, comprising:
   forming a first touch electrode;
   forming a second touch electrode, the first touch electrode and the second touch electrode being intersected with each other and insulated from each other;
   forming a first interconnecting member to connect the first touch electrode; and
   forming a second interconnecting member to connect the second touch electrode,
   wherein at least one of the first interconnecting member or the second interconnecting member is formed to define a first opening, and the second interconnecting member is electrically connected with the second touch electrode directly, wherein the first interconnecting member and the second interconnecting member are located in a same layer and are insulated from each other, each of the first interconnecting member and the second interconnecting member comprises a curved portion, and the curved portions of the first interconnecting member and the second interconnecting member surround the first opening together, an orthographic projection of the first interconnecting member on a first plane where the touch unit is located has an annular shape or a partially annular shape, and an orthographic projection of the second interconnecting member on the first plane where the touch unit is located has an annular shape or a partially annular shape, wherein on a first plane where the touch unit is located, an inner side of the first interconnecting member partially surrounds the first opening, wherein an area of the first interconnecting member is smaller than an area of the second interconnecting member.

14. The manufacturing method according to claim 13, wherein forming at least one of the first touch electrode or the second touch electrode comprises:

depositing a conductive material film;

performing a patterning process to the conductive material film to form at least two touch sub-electrodes spaced apart from each other, and forming at least one second opening in at least one of the at least two touch sub-electrodes.

* * * * *